US011837370B2

(12) United States Patent
Shargots

(10) Patent No.: US 11,837,370 B2
(45) Date of Patent: Dec. 5, 2023

(54) PRESSURIZED WATER REACTOR WITH UPPER VESSEL SECTION PROVIDING BOTH PRESSURE AND FLOW CONTROL

(71) Applicant: BWXT mPower, Inc., Charlotte, NC (US)

(72) Inventor: Scott J. Shargots, Forest, VA (US)

(73) Assignee: BWXT mPower, Inc., Charlotte, NC (US)

( * ) Notice: Subject to any disclaimer, the term of this patent is extended or adjusted under 35 U.S.C. 154(b) by 192 days.

(21) Appl. No.: 17/145,743

(22) Filed: Jan. 11, 2021

(65) Prior Publication Data

US 2022/0277862 A1 Sep. 1, 2022

Related U.S. Application Data

(62) Division of application No. 16/028,594, filed on Jul. 6, 2018, now Pat. No. 10,892,061, which is a division
(Continued)

(51) Int. Cl.
*G21C 15/24* (2006.01)
*G21C 1/32* (2006.01)
(Continued)

(52) U.S. Cl.
CPC .............. *G21C 1/32* (2013.01); *F04D 13/10* (2013.01); *G21C 1/086* (2013.01); *G21C 1/09* (2013.01);
(Continued)

(58) Field of Classification Search
CPC .............. G21C 1/32; G21C 15/24; G21D 1/04
See application file for complete search history.

(56) References Cited

U.S. PATENT DOCUMENTS 3,150,051 A * 9/1964 Ammon ................. G21C 1/322
376/400
3,245,879 A * 4/1966 Purdy ..................... G21C 1/326
976/DIG. 10
(Continued)

FOREIGN PATENT DOCUMENTS

CN 85101411 A 1/1987
EP 164525 A * 12/1985 ............... G21C 1/32
(Continued)

OTHER PUBLICATIONS

European Search Report for EP 12785072.5 dated Dec. 11, 2014.
(Continued)

*Primary Examiner* — Lily C Garner
(74) *Attorney, Agent, or Firm* — Nelson Mullins Riley & Scarborough LLP

(57) ABSTRACT

A pressurized water reactor (PWR) includes a vertical cylindrical pressure vessel having a lower portion containing a nuclear reactor core and a vessel head defining an integral pressurizer. A reactor coolant pump (RCP) mounted on the vessel head includes an impeller inside the pressure vessel, a pump motor outside the pressure vessel, and a vertical drive shaft connecting the motor and impeller. The drive shaft does not pass through the integral pressurizer. The drive shaft passes through a vessel penetration of the pressure vessel that is at least large enough for the impeller to pass through.

9 Claims, 8 Drawing Sheets

Related U.S. Application Data of application No. 14/673,087, filed on Mar. 30, 2015, now Pat. No. 10,020,077, which is a division of application No. 13/282,217, filed on Oct. 26, 2011, now Pat. No. 9,336,908.

(51) Int. Cl.

| | | |
|---|---|---|
| G21C 1/09 | (2006.01) | |
| G21C 15/243 | (2006.01) | |
| G21C 1/08 | (2006.01) | |
| F04D 13/10 | (2006.01) | |
| G21C 21/00 | (2006.01) | |
| G21D 1/04 | (2006.01) | |

(52) U.S. Cl.
CPC ........... *G21C 15/24* (2013.01); *G21C 15/243* (2013.01); *G21C 21/00* (2013.01); *G21D 1/04* (2013.01); *Y02E 30/30* (2013.01); *Y10T 29/49236* (2015.01); *Y10T 29/49245* (2015.01)

(56) References Cited

U.S. PATENT DOCUMENTS

| | | | |
|---|---|---|---|
| 3,267,906 A * | 8/1966 | Deighton | G21C 1/326 976/DIG. 10 |
| 3,290,222 A * | 12/1966 | Schoessow | G21C 1/322 376/281 |
| 3,384,549 A * | 5/1968 | Deliege | G21C 1/09 376/397 |
| 3,385,760 A * | 5/1968 | Hawkins | G21C 1/32 976/DIG. 6 |
| 3,401,082 A * | 9/1968 | Ammon | G21C 1/32 376/250 |
| 3,437,559 A | 4/1969 | Junkermann et al. | |
| 3,620,639 A | 11/1971 | Gaffal et al. | |
| 3,888,734 A * | 6/1975 | Juric | G21C 1/326 976/DIG. 10 |
| 3,947,154 A | 3/1976 | Klepp et al. | |
| 3,955,856 A | 5/1976 | Wayson et al. | |
| 4,039,377 A * | 8/1977 | Andrieu | G21C 1/322 976/DIG. 200 |
| 4,045,283 A | 8/1977 | Noyes et al. | |
| 4,057,467 A * | 11/1977 | Kostrzewa | G21C 1/322 976/DIG. 8 |
| 4,072,563 A | 2/1978 | McDonald et al. | |
| 4,158,602 A | 6/1979 | Minnick | |
| 4,844,857 A * | 7/1989 | Conrads | G21C 15/18 376/407 |
| 4,897,240 A * | 1/1990 | Sako | G21C 1/322 376/277 |
| 5,045,274 A | 9/1991 | Donaldson | |
| 5,053,190 A | 10/1991 | Gardner et al. | |
| 5,089,218 A | 2/1992 | Gardner et al. | |
| 5,124,115 A * | 6/1992 | Dillmann | F04D 29/047 376/407 |
| 5,135,711 A | 8/1992 | Borchardt et al. | |
| 5,295,171 A | 3/1994 | Aburomia et al. | |
| 5,426,675 A * | 6/1995 | Kumar | G21C 13/06 376/361 |
| 5,465,280 A | 11/1995 | Wedellsborg | |
| 5,517,539 A * | 5/1996 | Corpora | G21C 19/30 376/310 |
| 5,563,927 A | 10/1996 | Siegel et al. | |
| 5,583,900 A | 12/1996 | Kasahara et al. | |
| 5,715,288 A | 2/1998 | Matteson | |
| 5,789,720 A | 8/1998 | LaGally et al. | |
| 5,935,439 A | 8/1999 | Hart et al. | |
| 5,963,611 A * | 10/1999 | Narabayashi | B01D 53/24 96/216 |
| 6,091,791 A | 7/2000 | Matsumoto et al. | |
| 6,259,760 B1 | 7/2001 | Carelli et al. | |
| 6,357,114 B1 | 3/2002 | Tang et al. | |
| 6,506,955 B1 * | 1/2003 | Wilson | G21C 19/307 588/1 |
| 6,546,066 B2 | 4/2003 | Baliga et al. | |
| 6,581,667 B2 * | 6/2003 | Waring | F17C 1/00 160/351 |
| 6,618,460 B2 | 9/2003 | Baliga et al. | |
| 6,769,262 B1 | 8/2004 | Gray | |
| 6,813,328 B2 | 11/2004 | Kitch et al. | |
| 6,888,908 B1 | 5/2005 | Klamer et al. | |
| 6,909,765 B2 | 6/2005 | Lahoda | |
| 6,971,848 B2 * | 12/2005 | Watson | F04D 1/063 415/214.1 |
| 7,139,359 B2 | 11/2006 | Baliga et al. | |
| 7,389,669 B2 | 6/2008 | Badlani et al. | |
| 7,567,645 B2 | 7/2009 | Baliga | |
| 8,559,585 B2 * | 10/2013 | Carelli | G21C 15/182 376/292 |
| 9,336,908 B2 | 5/2016 | Shargots | |
| 9,343,187 B2 * | 5/2016 | Ales | G21C 1/322 |
| 10,020,077 B2 | 7/2018 | Shargots | |
| 10,892,061 B2 | 1/2021 | Shargots | |
| 2004/0017877 A1 | 1/2004 | Hartel et al. | |
| 2004/0136488 A1 | 7/2004 | Tuite et al. | |
| 2005/0117684 A1 | 6/2005 | Klarner et al. | |
| 2005/0190877 A1 | 9/2005 | Knapp | |
| 2005/0199591 A1 | 9/2005 | Coe et al. | |
| 2007/0234839 A1 | 10/2007 | Cordivari | |
| 2010/0316181 A1 | 12/2010 | Thome et al. | |
| 2015/0243389 A1 * | 8/2015 | Shargots | F04D 13/10 376/361 |
| 2018/0322965 A1 | 11/2018 | Shargots | |

FOREIGN PATENT DOCUMENTS

| | | |
|---|---|---|
| EP | 0164525 A1 | 12/1985 |
| GB | 1115354 A | 5/1968 |
| GB | 1115898 A | 5/1968 |

OTHER PUBLICATIONS

European Search Report for EP 12860813.0 dated Apr. 16, 2015.
Extended European Search Report dated Sep. 11, 2015 for European Patent Application No. 12860813.0.
International Search Report and Written Opinion for PCT/US2012/038401 dated Aug. 17, 2012.
International Search Report and Written Opinion for PCT/US2012/057840 dated Jun. 5, 2013.
Office Action dated Dec. 18, 2015 for Chinese Application No. 201210408944.3.
The Iris Spool-Type Reactor Coolant Pump, J. M. Kujawski, et al., Proceedings of ICONE10, 10th International Conference on Nuclear Engineering, Arlington, VA, Apr. 14-18, 2002.
Office Action dated Mar. 18, 2016 for U.S. Appl. No. 14/673,087.
Office Action, Canadian Application No. 2,853,313, dated Jul. 9, 2018, 4 pages.

\* cited by examiner

PRESSURIZED WATER REACTOR WITH UPPER VESSEL SECTION PROVIDING BOTH PRESSURE AND FLOW CONTROL

CLAIM OF PRIORITY

This application is a division of U.S. patent application Ser. No. 16/028,594, filed Jul. 6, 2018, now U.S. Pat. No. 10,892,061, which is a division of U.S. patent application Ser. No. 14/673,087, filed Mar. 30, 2015, now U.S. Pat. No. 10,020,077, which is a division of U.S. patent application Ser. No. 13/282,217, filed Oct. 26, 2011, now U.S. Pat. No. 9,336,908, the entire disclosures of which are incorporated by reference herein.

BACKGROUND

The following relates to the nuclear reactor arts, electrical power generation arts, nuclear reactor control arts, nuclear electrical power generation control arts, thermal management arts, and related arts.

In nuclear reactor designs for steam generation, such as boiling water reactor (BWR) and pressurized water reactor (PWR) designs, a radioactive reactor core is immersed in primary coolant water at or near the bottom of a pressure vessel. In BWR designs heat generated by the reactor core boils the primary coolant water creating steam that is extracted by components (e.g., steam separators, steam dryer, or so forth) located at or near the top of the pressure vessel. In PWR designs the primary coolant is maintained in a compressed or subcooled liquid phase and is either flowed out of the pressure vessel into an external steam generator, or a steam generator is located within the pressure vessel (sometimes called an "integral PWR" design). In either design, heated primary coolant water heats secondary coolant water in the steam generator to generate steam. An advantage of the PWR design is that the steam comprises secondary coolant water that is not exposed to the radioactive reactor core.

In either a BWR design or a PWR design, the primary coolant flows through a closed circulation path. Primary coolant water flowing upward through the reactor core is heated and rises through a central region to the top of the reactor, where it reverses direction and flows downward back to the reactor core through a downcomer annulus defined between the pressure vessel and a concentric riser structure. This is a natural convection flow circuit for such a reactor configuration. However, for higher power reactors it is advantageous or necessary to supplement or supplant the natural convection with motive force provided by electromechanical reactor coolant pumps.

In a conventional approach, glandless pumps are used, in which a unitary drive shaft/impeller subassembly is rotated by a pump motor. This design has the advantage of not including any seals at the drive shaft/impeller connection (hence the name "glandless"). For nuclear reactors, a common implementation is to provide a unitary reactor coolant pump comprising the sealless drive shaft/impeller subassembly, the motor (including the stator, a rotor magnet or windings, and suitable bearings or other drive shaft couplings), and a supporting flange that supports the motor and includes a graphalloy seal through which the drive shaft passes to connect the pump motor with the impeller. The reactor coolant pump is installed by inserting the impeller through an opening in the reactor pressure vessel and securing the flange over the opening. When installed, the impeller is located inside the pressure vessel and the pump motor is located outside of the pressure vessel (and preferably outside of any insulating material disposed around the pressure vessel). Although the motor is outside of the pressure vessel, sufficient heat still transfers to the pump motor so that dedicated motor cooling is typically provided in the form of a heat exchanger or the like. External placement of the pump motor simplifies electrical power connection and enables the pump motor to be designed for a rated temperature substantially lower than that of the primary coolant water inside the pressure vessel. Only the impeller and the impeller end of the drive shaft penetrate inside the pressure vessel.

Disclosed herein are improvements that provide various benefits that will become apparent to the skilled artisan upon reading the following.

BRIEF SUMMARY

In one aspect of the disclosure, an apparatus comprises a pressurized water reactor (PWR) including: a cylindrical pressure vessel with its cylinder axis oriented vertically; a nuclear reactor core disposed in the cylindrical pressure vessel; a separator plate disposed in the cylindrical pressure vessel that separates the pressure vessel to define an integral pressurizer containing a pressurizer volume disposed above the separator plate and a reactor vessel portion defining a reactor volume disposed below the separator plate and containing the nuclear reactor core, wherein the separator plate restricts but does not completely cut off fluid communication between the pressurizer volume and the reactor volume; and a reactor coolant pump including (i) an impeller disposed inside the pressure vessel in the reactor volume, (ii) a pump motor disposed outside of the pressure vessel, and (iii) a drive shaft operatively connecting the pump motor with the impeller, wherein (1) at least a portion of the pump motor is disposed above the separator plate, (2) no portion of the reactor coolant pump is disposed in the pressurizer volume, and (3) the drive shaft passes through an opening in the pressure vessel that is at least large enough to pass the impeller.

In another aspect of the disclosure, a method comprises installing a reactor coolant pump comprising a pump motor, a driveshaft, an impeller, and a mounting flange on a pressurized water reactor (PWR) comprising a pressure vessel and a nuclear reactor core disposed in the pressure vessel, the installing including: pre-assembling the pump motor, the driveshaft, the impeller, and the mounting flange outside of the pressure vessel to form a pump assembly as a unit disposed outside of the pressure vessel in which the pump motor is connected with the impeller by the driveshaft; inserting the impeller and the driveshaft of the pump assembly through an opening of the pressure vessel while the pump motor remains outside of the pressure vessel; and securing the flange of the pump assembly to an outside of the pressure vessel to mount the pump assembly on the pressure vessel; wherein the inserting and securing mounts the pump assembly on the pressure vessel with the drive shaft of the pump assembly oriented vertically.

In another aspect of the disclosure, the reactor coolant pump of the immediately preceding paragraph further comprises a pump diffuser that is not a component of the unitary pump assembly formed by the pre-assembling, and the installing of the immediately preceding paragraph further comprises disposing the pump diffuser inside the pressure vessel in an operation other than the inserting and the securing operations.

In another aspect of the disclosure, an apparatus comprises a reactor coolant pump including a pump assembly and a pump diffuser. The pump assembly includes a pump motor, an impeller, and a driveshaft that operatively connects the pump motor and the impeller as said pump assembly. The pump diffuser is configured to receive the impeller. The pump diffuser is not secured with the pump assembly.

In another aspect of the disclosure, an apparatus comprises a reactor coolant pump as set forth in the immediately preceding paragraph, and a pressurized water reactor (PWR) including a cylindrical pressure vessel with its cylinder axis oriented vertically, a nuclear reactor core disposed in the cylindrical pressure vessel, and a separator plate disposed in the cylindrical pressure vessel that separates the pressure vessel to define an integral pressurizer volume disposed above the separator plate and a reactor vessel portion containing the nuclear reactor core disposed below the separator plate. The reactor coolant pump is mounted on the cylindrical pressure vessel of the PWR with the impeller disposed in the pump diffuser and with at least a portion of the pump motor being disposed above the separator plate. No portion of the reactor coolant pump passes through the integral pressurizer volume.

In another aspect of the disclosure, an apparatus comprises a reactor coolant pump and a pressurized water reactor (PWR). The reactor coolant pump includes a pump motor, an impeller, a driveshaft that operatively connects the pump motor and the impeller, and a pump diffuser. The pump motor, the impeller, the driveshaft, and the pump diffuser are secured together as a unitary pump assembly with the impeller disposed in the pump diffuser. The PWR includes a cylindrical pressure vessel with its cylinder axis oriented vertically, a nuclear reactor core disposed in the cylindrical pressure vessel, and a separator plate disposed in the cylindrical pressure vessel that separates the pressure vessel to define an integral pressurizer volume disposed above the separator plate and a reactor vessel portion containing the nuclear reactor core disposed below the separator plate. The unitary pump assembly is mounted on the cylindrical pressure vessel of the PWR with at least a portion of the pump motor disposed above the separator plate and with no portion of the reactor coolant pump passing through the integral pressurizer volume.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Figure 1:
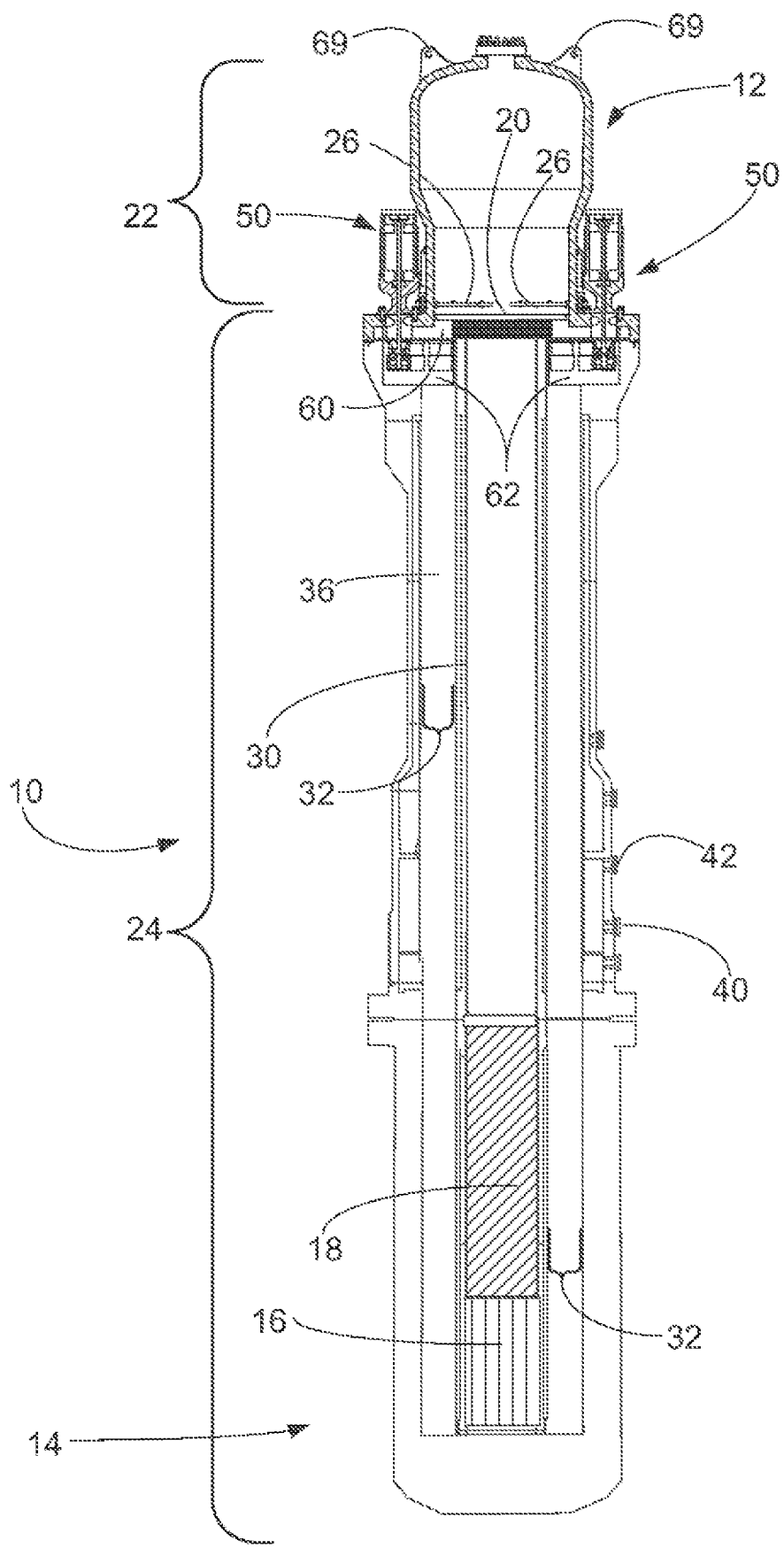
FIG. 1 diagrammatically shows a side sectional view of a pressurized water reactor (PWR) including an integral pressurizer and reactor coolant pumps (RCPs).
Figure 2:
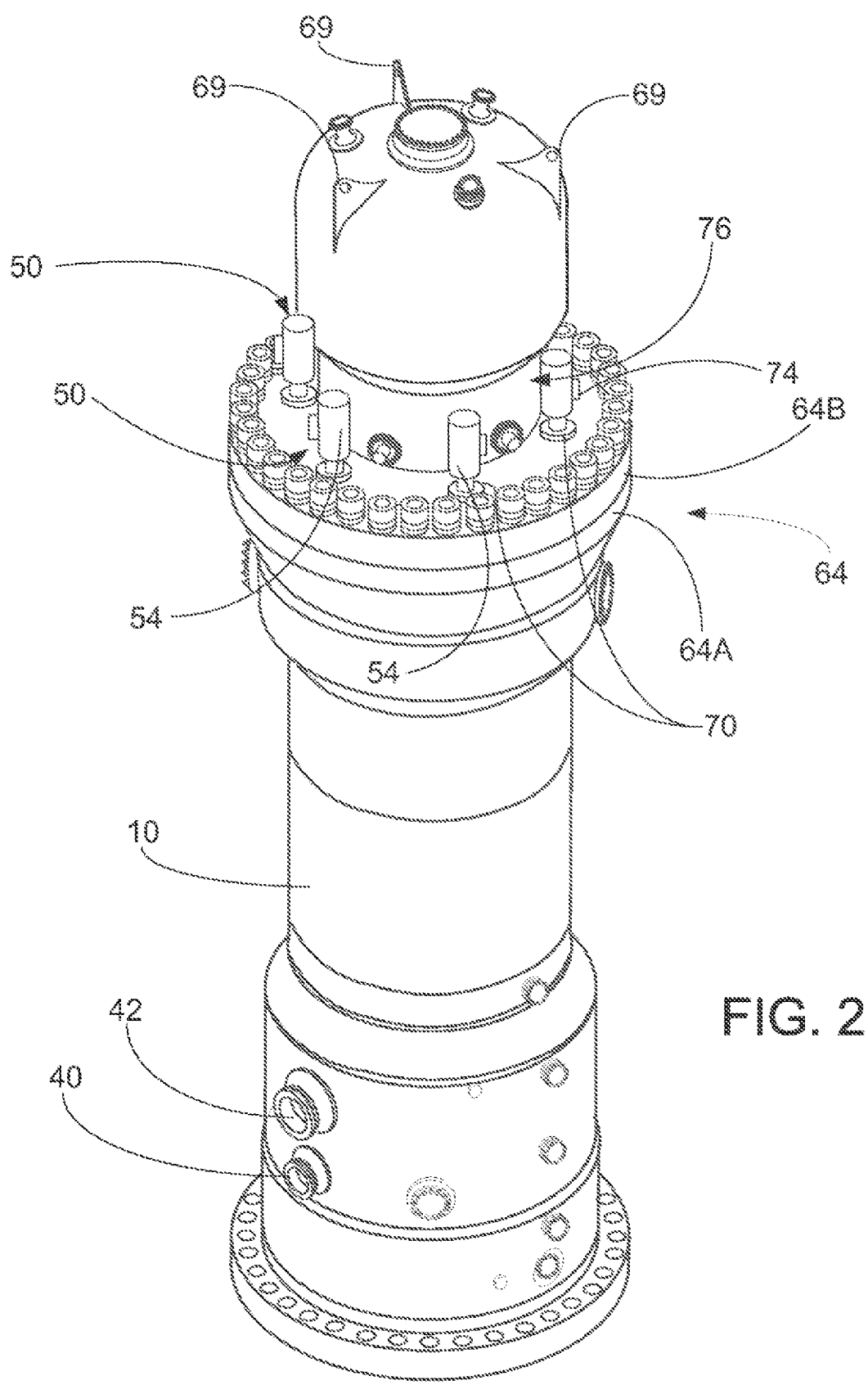
FIG. 2 diagrammatically shows a perspective view of the upper vessel section of the PWR of FIG. 1.
Figure 3:
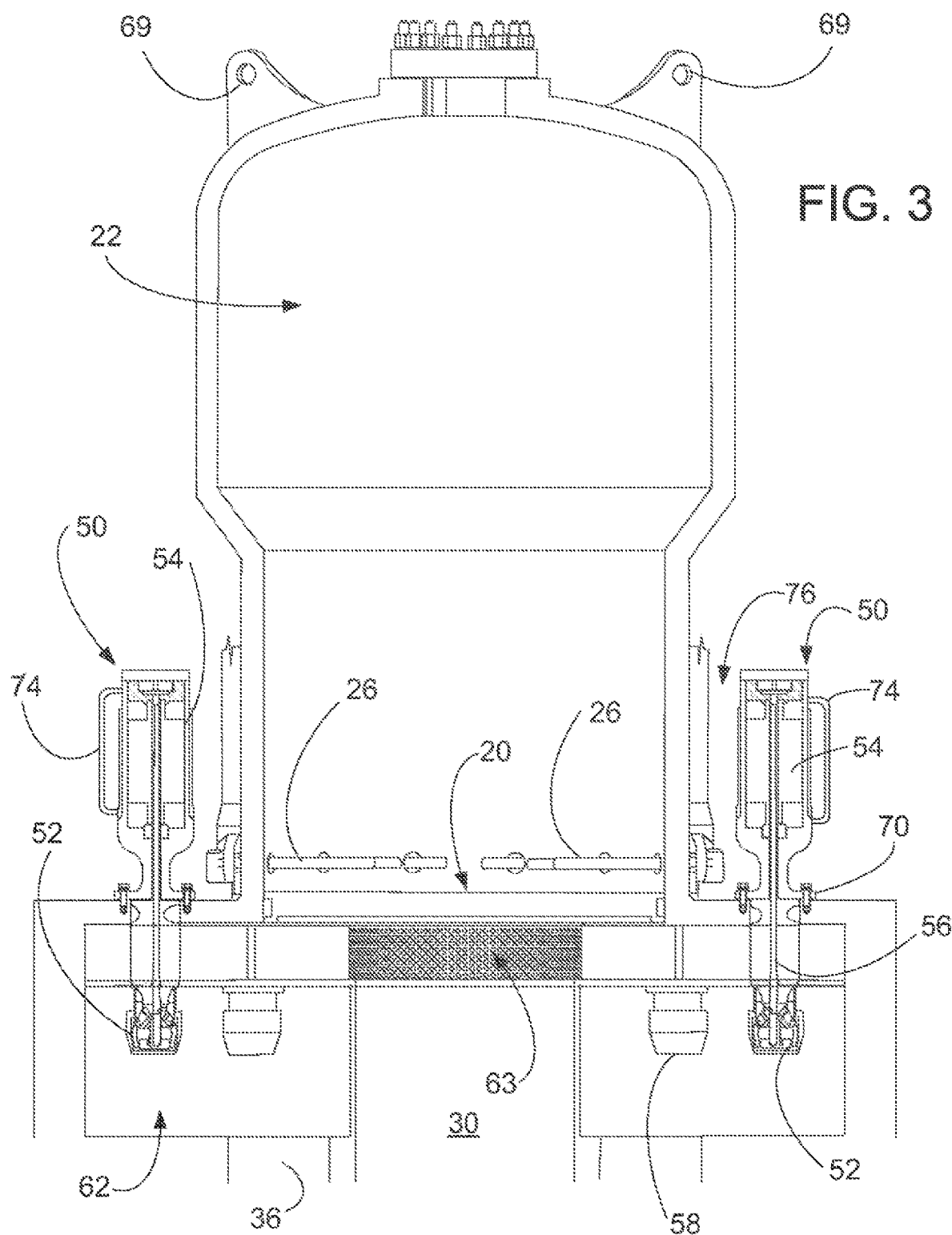
FIG. 3 diagrammatically shows a side sectional view of the vessel head region of the PWR of FIG. 1 including the integral pressurizer and RCPs.

With reference to FIGS. 1-4, a pressurized water reactor (PWR) includes a cylindrical pressure vessel 10. As used herein, the phrase "cylindrical pressure vessel" indicates that the pressure vessel has a generally cylindrical shape, but may in some embodiments deviate from a mathematically perfect cylinder. For example, the illustrative cylindrical pressure vessel 10 has a circular cross-section of varying diameter along the length of the cylinder, and has rounded ends, and includes various vessel penetrations, vessel section flange connections, and so forth. The cylindrical pressure vessel 10 is mounted in an upright position having an upper end 12 and a lower end 14. However, it is contemplated for the upright position to deviate from exact vertical orientation of the cylinder axis. For example, if the PWR is disposed in a maritime vessel then it may be upright but with some tilt, which may vary with time, due to movement of the maritime vessel on or beneath the water. The PWR further includes a diagrammatically indicated radioactive nuclear reactor core 16 comprising a mass of fissile material, such as a material containing uranium oxide ($UO_2$) that is enriched in the fissile $^{235}U$ isotope, arranged fuel rod bundles or so forth disposed in a fuel basket or other support assembly configured to mount in suitable mounting brackets or retention structures of the pressure vessel 10 (core mounting features not shown). Reactivity control is provided by a diagrammatically indicated control rod system 18, typically comprises assemblies of control rods that are mounted on connecting rods, spiders, or other support elements. The control rods comprise a neutron absorbing material and the control rod assemblies (CRA's) are operatively connected with control rod drive mechanism (CRDM) units that controllably insert or withdraw the control rods into or out of the reactor core 16 to control or stop the chain reaction. As with the reactor core 16, the control rod system 18 is shown diagrammatically and individual components such as individual control rods, connecting rods, spiders, and CRDM units are not shown. The diagrammatically illustrated control rod system is an internal system in which the CRDM units are disposed inside the pressure vessel 10. Some illustrative examples of internal control rod system designs include: Stambaugh et al., "Control Rod Drive Mechanism for Nuclear Reactor", U.S. Pub. No. 2010/0316177 A1 published Dec. 16, 2010 which is incorporated herein by reference in its entirety; and Stambaugh et al., "Control Rod Drive Mechanism for Nuclear Reactor", Int'l Pub. WO 2010/144563 A1 published Dec. 16, 2010 which is incorporated herein by reference in its entirety. Alternatively, external CRDM units may be used—however, external CRDM units require mechanical penetrations through the top or bottom of the pressure vessel 10 to connect with the control rods.

In its operating state, the pressure vessel 10 of the PWR contains primary coolant water that serves as primary coolant and as a moderator material that thermalizes neutrons.

The illustrative PWR includes an integral pressurizer as follows. A separator plate 20 is disposed in the cylindrical pressure vessel 10. The separator plate 20 separates the pressure vessel 10 to define: (1) an integral pressurizer 22 containing a pressurizer volume disposed above the separator plate 20; and (2) a reactor vessel portion 24 defining a reactor volume disposed below the separator plate 20. The nuclear reactor core 16 and the control rod system 18 is disposed in the reactor volume. The separator plate 20 restricts but does not completely cut off fluid communication between the pressurizer volume and the reactor volume. As a result, pressure in the pressurizer volume communicates to the reactor volume, so that the operating pressure of the reactor volume can be adjusted by adjusting pressure in the pressurizer volume. Toward this end, a steam bubble is maintained in the upper portion of the pressurizer volume, and the integral pressurizer 22 includes heater elements 26 for applying heat to increase the temperature (and hence increase pressure) in the integral pressurizer 22. Although not shown, spargers may also be provided to inject cooler steam or water to lower the temperature (and hence pressure) in the integral pressurizer 22. In a PWR the primary coolant water is maintained in a subcooled state. By way of illustrative example, in some contemplated embodiments the primary coolant pressure in the sealed volume of the pressure vessel 10 is at a pressure of about 2000 psia and at a temperature of about 300-320° C. Again, this is merely an illustrative example, and a diverse range of other subcooled PWR operating pressures and temperatures are also contemplated.

The reactor core 16 is disposed in the reactor volume, typically near the lower end 14 of the pressure vessel 10, and is immersed in the primary coolant water which fills the pressure vessel 10 except for the steam bubble of the integral pressurizer 22. (The steam bubble also comprises primary coolant, but in a steam phase). The primary coolant water is heated by the radioactive chain reaction occurring in the nuclear reactor core 16. A primary coolant flow circuit is defined by a cylindrical central riser 30 disposed concentrically with and inside the cylindrical pressure vessel 10, and more particularly in the reactor volume. Heated primary coolant water rises upward through the central riser 30 until it reaches the top of the riser, at which point it reverses flow and falls through a downcomer annulus 32 defined between the cylindrical central riser 30 and the cylindrical pressure vessel 10. At the bottom of the downcomer annulus 32 the primary coolant water flow again reverses and flows back upward through the nuclear reactor core 16 to complete the circuit.

In some embodiments, an annular internal steam generator 36 is disposed in the downcomer annulus 32. Secondary coolant water flows into a feedwater inlet 40 (optionally after buffering in a feedwater plenum), through the internal steam generator 36 where it is heated by proximate primary coolant in the downcomer annulus 32 and converted to steam, and the steam flows out a steam outlet 42 (again, optionally after buffering in a steam plenum). The output steam may be used for driving a turbine to generate electricity or for some other use (external plant features not shown). A PWR with an internal steam generator is sometimes referred to as an integral PWR, an illustrative example of which is shown in Thome et al., "Integral Helical Coil Pressurized Water Nuclear Reactor", U.S. Pub. No. 2010/0316181 A1 published Dec. 16, 2010 which is incorporated herein by reference in its entirety. While this publication discloses a steam generator employing helical steam generator tubes, other tube geometries including straight (e.g., vertical) once-through steam generator tubes, or recirculating steam generators, or U-Tube steam generators, or so forth are also contemplated.

Figure 4:
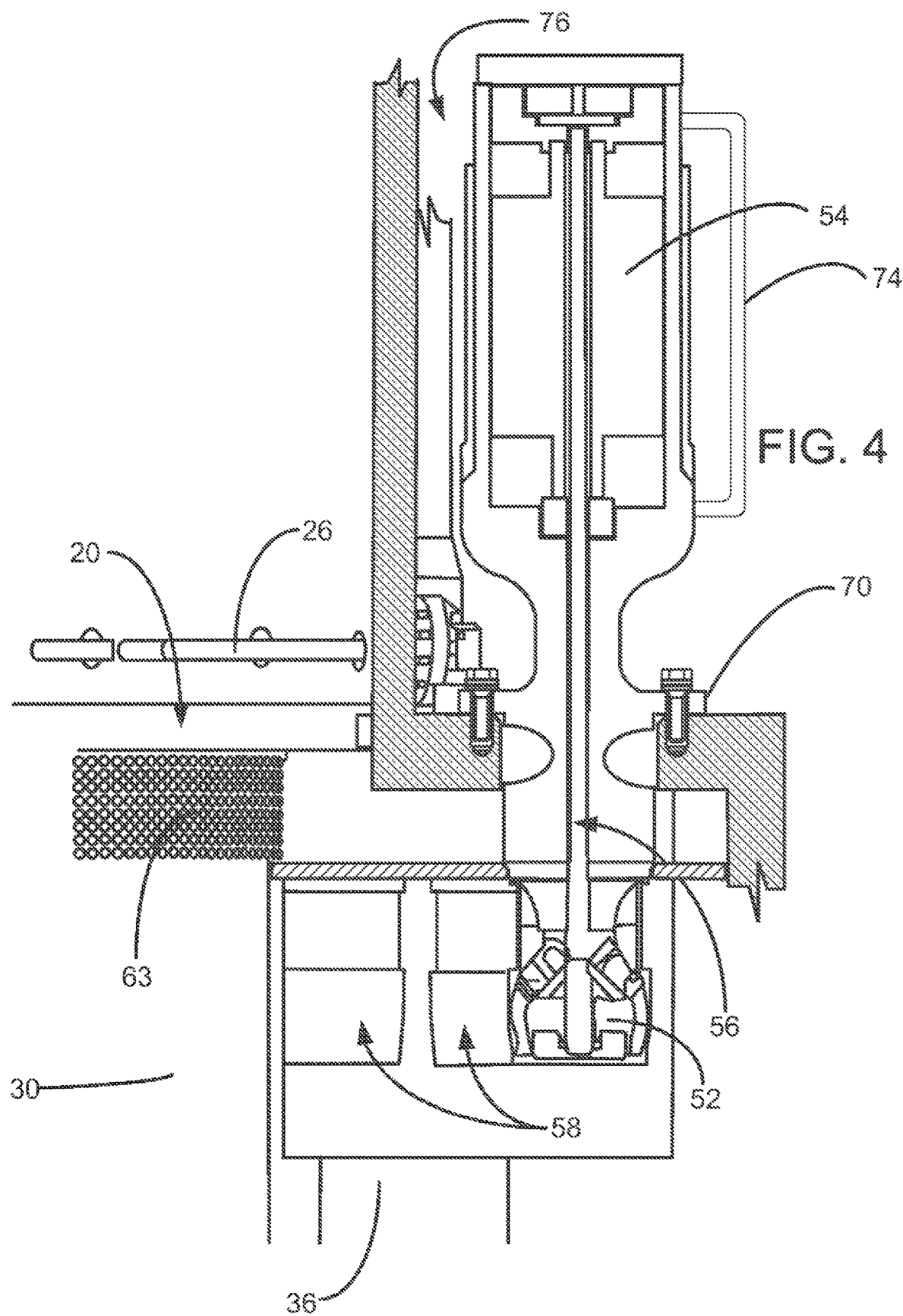
FIG. 4 diagrammatically shows a side sectional view of one of the reactor coolant pumps (RCPs).

In embodiments disclosed herein, circulation of the primary coolant water is assisted or driven by reactor coolant pumps (RCPs) 50. With particular reference to FIG. 4, each reactor coolant pump (RCP) 50 includes: an impeller 52 disposed inside the pressure vessel 10 (and more particularly in the reactor volume); a pump motor 54 disposed outside of the pressure vessel 10; and a drive shaft 56 operatively connecting the pump motor 54 with the impeller 52. At least a portion of the pump motor 54 is disposed above the separator plate 20, and no portion of the reactor coolant pump 50 is disposed in the pressurizer volume of the integral pressurizer 22. Each RCP 50 of the embodiment of FIGS. 1-4 further includes an annular pump casing or diffuser 58 containing the impeller 52.

Locating the RCPs 50 proximate to the integral pressurizer 22 places the openings in the pressure vessel 10 for passage of the drive shafts 56 at elevated positions. This elevated placement reduces the likelihood of substantial primary coolant loss in the event of a loss of coolant accident (LOCA) involving the RCPs 50. Moreover, the impellers 52 operate at the "turnaround" point of the primary coolant flow circuit, that is, at the point where the primary coolant water reverses flow direction from the upward flow through the central riser 30 to the downward flow through the downcomer annulus 32. Since this flow reversal already introduces some flow turbulence, any additional turbulence introduced by operation of the RCPs 50 is likely to be negligible. The RCPs 50 also do not impede natural circulation, which facilitates the implementation of various passive emergency cooling systems that rely upon natural circulation in the event of a loss of electrical power for driving the RCPs 50. Still further, the RCPs 50 are also far away from the reactor core 16 and hence are unlikely to introduce flow turbulence in the core 16 (with its potential for consequent temperature variability).

On the other hand, the placement of the RCPs 50 at the elevated position has the potential to introduce turbulence in the primary coolant water flow into the internal steam generator 36. To reduce any such effect, in the embodiment of FIGS. 1-4 the RCPs 50 are buffered by an inlet plenum 60 and an outlet plenum 62. Primary coolant water flowing out of the top of the cylindrical central riser 30 flows into the inlet plenum 60 where the flow reverses direction, aided by the RCPs 50 which impel the primary coolant water to flow downward into the downcomer annulus 32. Said another way, the RCPs 50 discharge primary coolant into the outlet plenum 62 which separates the RCPs 50 from the internal steam generator 36. Optionally, a flow diverter element or structure may be provided at or proximate to the top of the central riser 30 to assist in the flow reversal. In the illustrative embodiment, a flow diverter screen 63 serves this purpose; however, in other embodiments other diverter elements or structures may be used. By way of additional illustrative examples, the flow diverter or structure may be embodied by side openings near the top of the central riser, or by shaping the separator plate to serve as a flow diverter. Alternatively, a flow diverter structure may be on the outlet plenum 62.

The RCPs 50 output impelled primary coolant water into the output plenum 62 which buffers flow from the pumps into the annular steam generator 36. The primary coolant flows from the outlet plenum 62 either into the steam generator tubes (in embodiments in which the higher pressure primary coolant flows inside the steam generator tubes)

or into a volume surrounding the steam generator tubes (in embodiments in which the higher pressure primary coolant flows outside the steam generator tubes). In either case, the primary coolant flow from the RCPs 50 into the steam generator 36 is buffered so as to reduce flow inhomogeneity. Additionally, because each RCP 50 outputs into the outlet plenum 62 and is not mechanically connected with an inlet of the internal steam generator 36, the failure of one RCP 50 is less problematic. (By comparison, if the RCPs are mechanically coupled into specific inlets of the steam generator, for example by constructing the pump casing so that its outlet is coupled with an inlet of the steam generator, then the failure of one RCP completely removes the coupled portion of the steam generator from use).

The illustrative RCPs 50 of FIGS. 1-5 are mounted using relatively small openings in the pressure vessel 10. In particular, in some embodiments the opening through which the driveshaft 56 passes is too small for the pump casing 58 to pass through.

Figure 5:
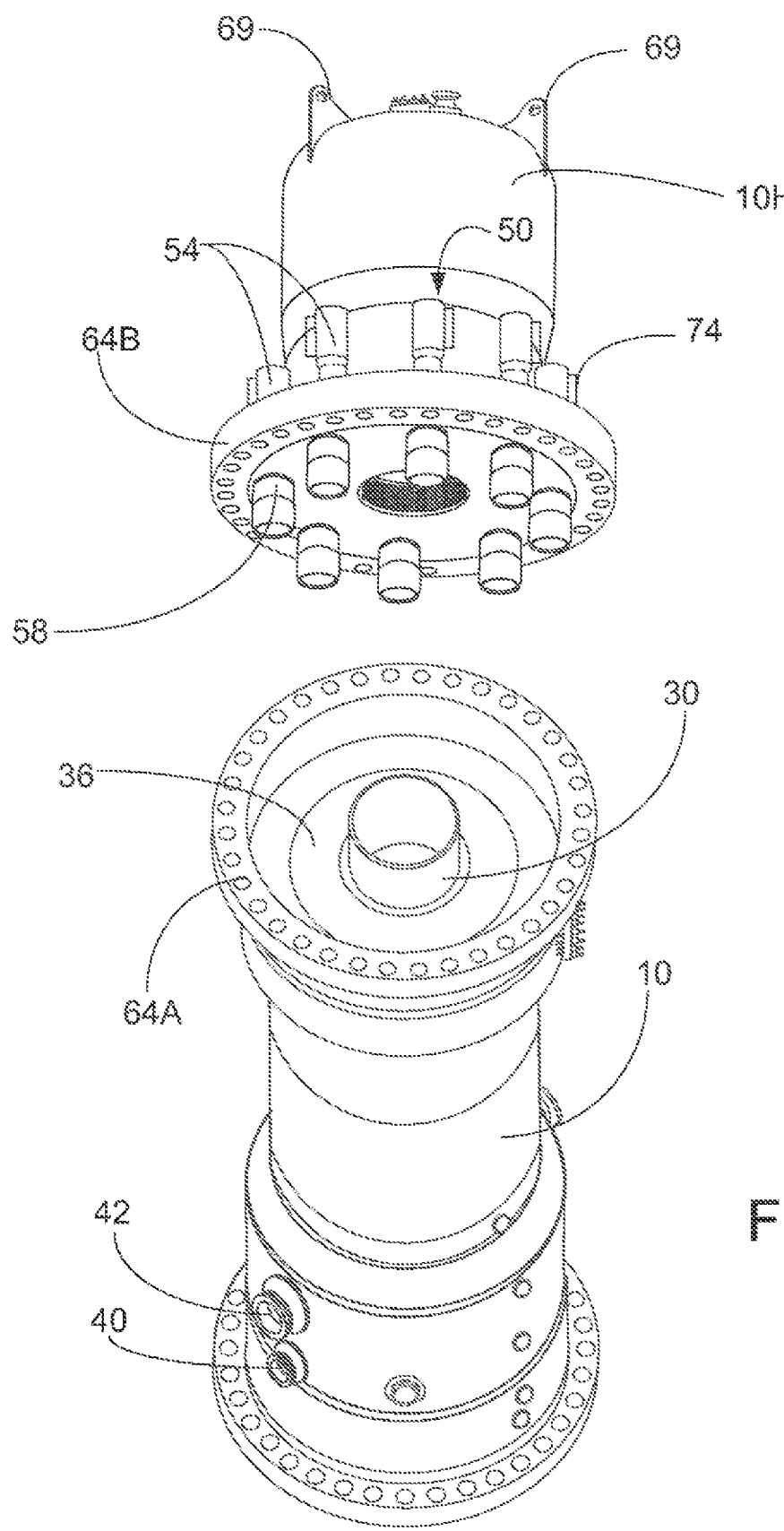
FIG. 5 diagrammatically shows a perspective view of the upper vessel section of the PWR of FIG. 1 with the closure opened to remove the vessel head from the remainder of the vessel, and with the vessel head and remainder of the vessel both tilted to reveal selected internal components.

With reference to FIG. 5, to enable the disclosed approach in which the opening is too small for the pump casing 58 to pass through, the pressure vessel 10 includes a closure at or below the separator plate 20 and (in the illustrative example) at or above the top of the internal steam generator 36. The closure includes mating flanges 64A, 64B that seal together in mating fashion with suitable fasteners such as a combination of cooperating tension nuts and tension studs. In this way, a head 10H of the pressure vessel 10 can be removed from the remainder of the pressure vessel 10 by opening the closure 64 (e.g., by removing the fasteners) and lifting off the vessel head via lifting lugs 69 thus separating the flanges 64A, 64B (see FIG. 5, but note that FIG. 5 diagrammatically shows the head 10H and vessel remainder each tilted to reveal internal components; whereas, typically the head 10H is removed by lifting it straight up, i.e. vertically, using a crane or the like and then optionally moving the lifted head 10H laterally to a docking location). The vessel head 10H defines the integral pressurizer 22 and also includes the portion of the pressure vessel 10 that supports the RCPs 50. Therefore, removing the head 10H of the pressure vessel 10 simultaneously removes the integral pressurizer 22 and the RCPs 50. Removal of the vessel head 10H exposes the upper and lower surfaces of the outlet plenum 62 and provides access from below to the pump casings 58. Thus, during a maintenance period during which the pressure vessel 10 is depressurized and the vessel head 10H removed, the pump casings 58 could be installed or replaced if needed.

The RCP 50 can be installed as follows. The pump casings 58 are typically installed first. This can be done during manufacture of the vessel head 10H or at any time prior to installation of the vessel head 10H to form the complete pressure vessel 10. The pump motor 54, impeller 52, and connecting drive shaft 56 are pre-assembled as a unit, and in some embodiments may be a commercially available pump such as a glandless pump of the type used in boil water reactor (BWR) systems. The pump assembly 52, 54, 56 is mounted as a unit at an opening of the pressure vessel 10 by inserting the impeller 52 and drive shaft 56 into the opening and bolting a mounting flange 70 of the pump assembly to the pressure vessel 10 with the mounted pump motor 54 located outside the pressure vessel 10 and supported on the pressure vessel 10 by the mounting flange 70. In an alternative assembly sequence, it is contemplated to mount the pump assembly 52, 54, 56 as a unit onto the pressure vessel 10 prior to installation of the vessel head 10H to form the complete pressure vessel 10 and either before or after installation of the pump casings 58.

By employing the illustrative embodiment in which the opening for the RCP 50 is too small for the pump casing 58 to pass, these openings are made small so as to minimize the likelihood and extent of a loss of coolant accident (LOCA) at these openings. However, the approach still enables use of a commercially available unitary pump assembly including the pump motor 54, impeller 52, and drive shaft 56 secured together as said unitary pump assembly. The pump casing 58, on the other hand, is not secured with the unitary pump assembly 52, 54, 56.

The number of RCPs 50 is selected to provide sufficient motive force for maintaining the desired primary coolant flow through the primary coolant circuit. Additional RCPs 50 may be provided to ensure redundancy in the event of failure of one or two RCPs. If there are N reactor coolant pumps (where N is an integer greater than or equal to 2, for example N=12 in some embodiments) then they are preferably spaced apart evenly, e.g. at 360°/N intervals around the cylinder axis of the cylindrical pressure vessel 10 (e.g., intervals of 30° for N=12). The externally mounted pump motors 54 are advantageously spaced apart from the high temperature environment inside the pressure vessel 10. Nonetheless, substantial heat is still expected to flow into the pump motors 54 by conduction through the flanges 70 and by radiation/convection from the exterior of the pressure vessel 10. Accordingly, in the illustrative embodiment the RCPs 50 further include heat exchangers 74 for removing heat from the pump motors 54. Alternative thermal control mechanisms can be provided, such as an open-loop coolant flow circuit carrying water, air, or another coolant fluid. Moreover, it is contemplated to omit such thermal control mechanisms entirely if the pump motors 54 are rated for sufficiently high temperature operation.

Another advantage of the illustrative configuration is that the pump motor 54 of the RCP 50 is mounted vertically, with the drive shaft 56 vertically oriented and parallel with the cylinder axis of the cylindrical pressure vessel 10. This vertical arrangement eliminates sideways forces on the rotating motor 54 and rotating drive shaft 56, which in turn reduces wear on the pump motor 54 and other pump components.

Yet another advantage of the illustrative configuration is that no portion of the RCP 50 passes through the integral pressurizer volume. This simplifies design of the integral pressurizer 22 and shortens the length of the drive shaft 56. However, since conventionally the pressurizer is located at the top of the pressure vessel, achieving this arrangement in combination with vertically oriented pump motors 54 and vertically oriented drive shafts 56 entails reconfiguring the pressurizer. In the embodiment of FIGS. 1-5, the cross-section of the vessel head of the cylindrical pressure vessel 10 includes a narrowed portion defining a recess 76 of the integral pressurizer 22. The recess 76 allows the pump motors 54 to be disposed at least partially in the recess 76 so as to provide sufficient room for the vertically mounted pump motors 54. The recess 76 should be large enough to accommodate the pump motor 54 during installation.

Still yet another advantage of placing the RCPs 50 at the head of the pressure vessel is that this arrangement does not occupy space lower down in the pressure vessel, thus leaving that space available for accommodating internal CRDM units, a larger steam generator, or so forth.

The embodiment of FIG. 1-5 is illustrative, and it is contemplated that the various components such as the integral pressurizer 22, the RCPs 50, and so forth may be modified in various ways. With reference to FIGS. 6-9, some additional illustrative embodiments are set forth.

Figure 6:
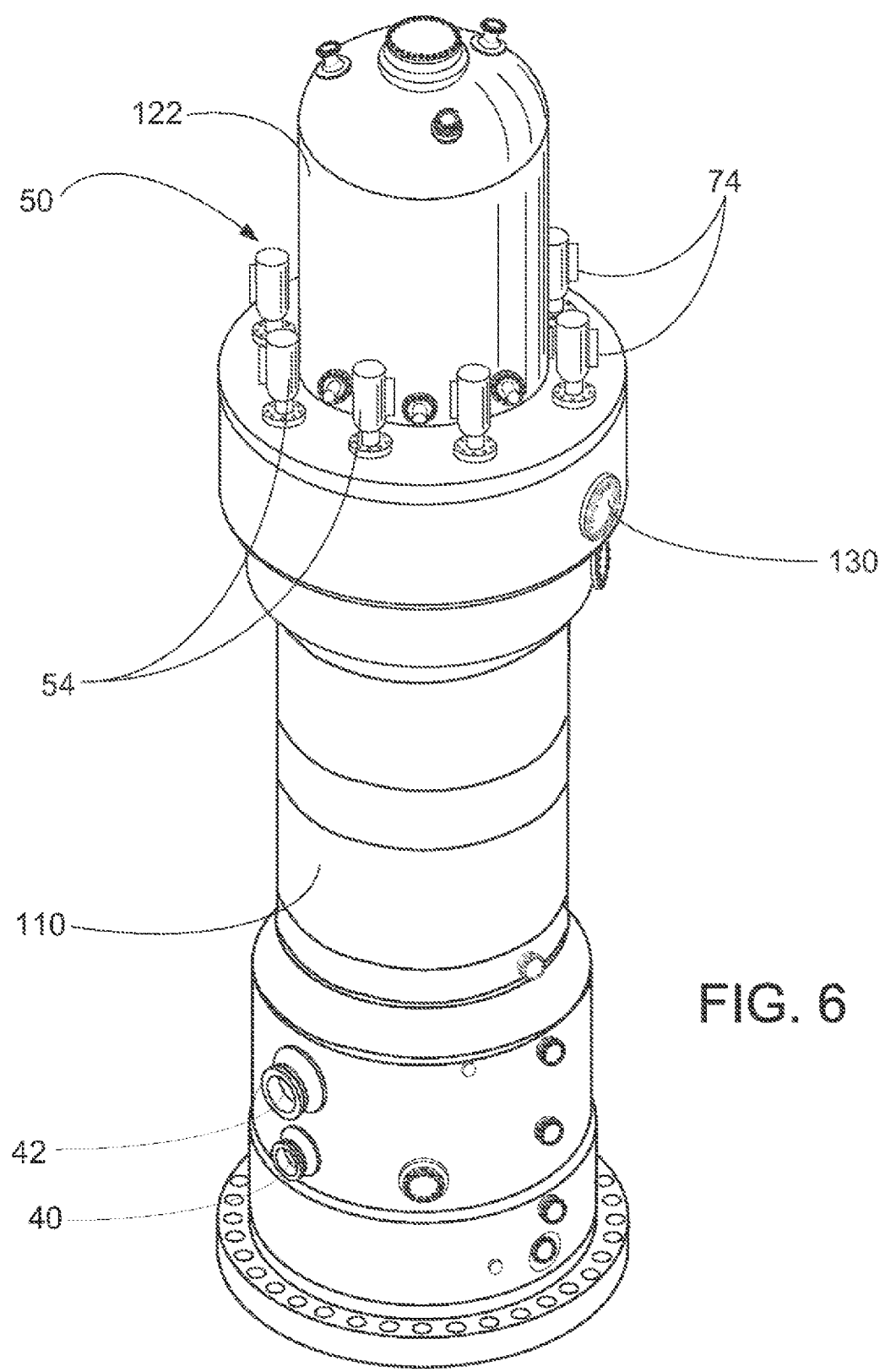
FIGS. 6 and 7 diagrammatically shows a perspective view and enlarged sectional perspective view, respectively, of an alternative embodiment of the upper vessel section that omits the closure for removing the vessel head and that employs a differently shaped integral pressurizer.
Figure 7:
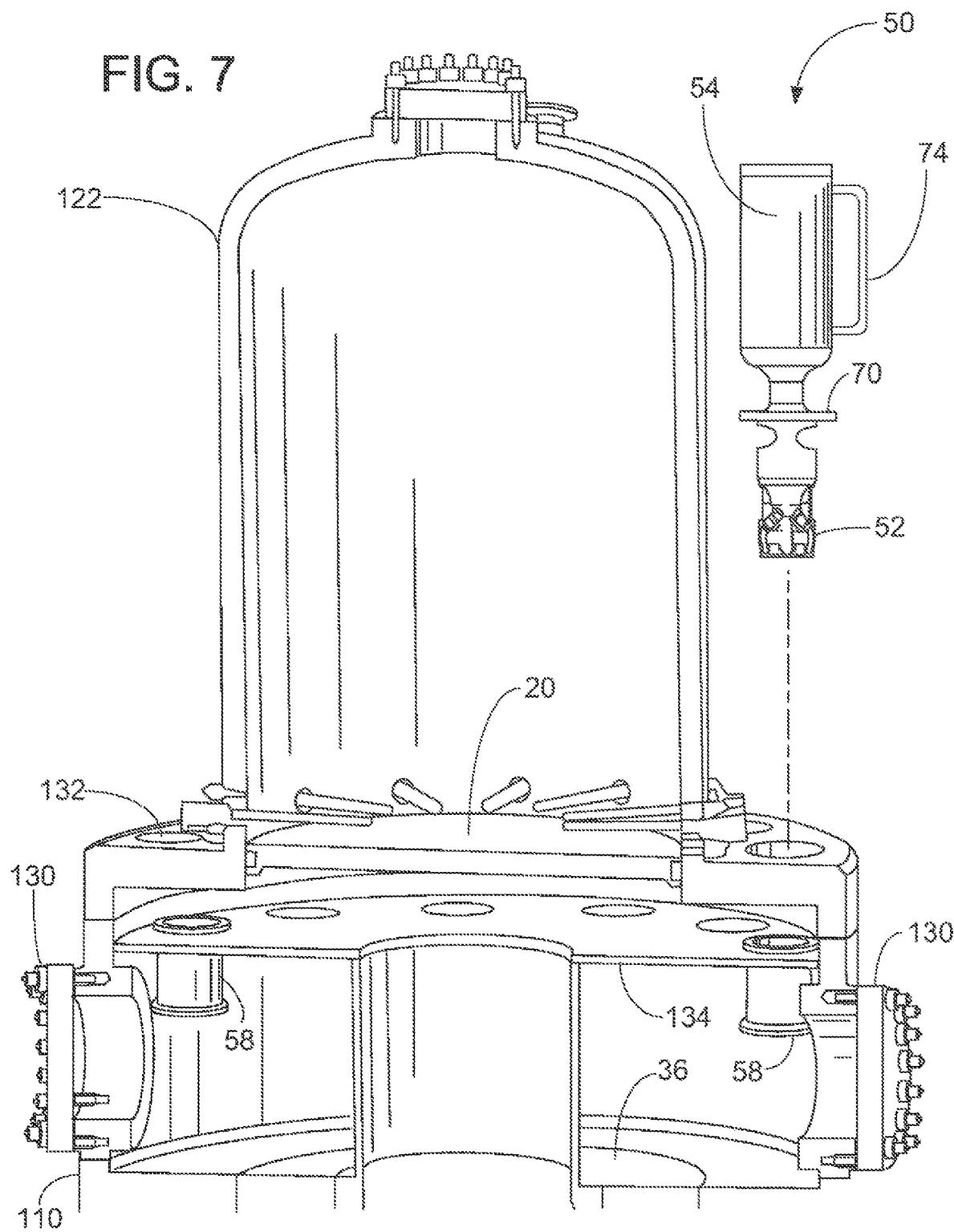

With reference to FIGS. 6 and 7, an alternative embodiment of the upper vessel section is shown. The alternative embodiment of FIGS. 6 and 7 differs from the embodiment of FIGS. 1-5 in that it has a modified pressure vessel 110 in which (1) the closure 64 for removing the vessel head is omitted and (2) a differently shaped integral pressurizer 122 is provided.

Unlike the integral pressurizer 22 of the embodiment of FIGS. 1-5 which included the recess 76 for accommodating the RCPs 50, the integral pressurizer 122 is instead narrowed (that is, of smaller cross-section diameter) over its entire height to accommodate the RCPs 50. This approach has the advantage of providing more vertical space for mounting the pump motors 54 (which can be especially advantageous if a long drive shaft is inserted when the motor is installed). A disadvantage of the integral pressurizer 122 as compared with the pressurizer 22 is that the former has reduced a reduced pressurizer volume due to its being narrowed over its entire height rather than over only the recess 76.

The embodiment of FIGS. 6 and 7 can employ the same RCP mounting arrangement as is used in the embodiment of FIGS. 1-5, including mounting the RCP 50 at an opening of the pressure vessel that is too small for the pump casing or diffuser 58 to pass through. Since the vessel head is not removable to allow insertion of the diffuser 58, another access pathway such as an illustrative manway 130 is suitably provided for inserting the diffuser 58 into the pressure vessel. The manway 130 is typically already required to provide access for performing steam generator tube plugging or other maintenance operations—accordingly, no additional vessel penetration is required to enable the use of the disclosed pumps installed at small vessel openings.

With particular reference to FIG. 7, installation of the RCPs 50 is shown. FIG. 7 shows the vessel head before installation of the RCPs 50, and with one RCP 50 positioned above an opening 132 that is sized to be too small to pass the diffuser 58 but is large enough to pass the impeller 52. In illustrative FIG. 7 the corresponding diffuser 58 is already mounted inside the pressure vessel 110 on a support plate 134 below the pressurizer separator plate 20. The support plate 134 also serves as the pressure divider separating the suction and discharge sides of the diffuser 58. In FIG. 7 the manways 130 are shown as capped. (Note that in FIG. 7 only two diffusers 58 are shown, with one that corresponds to the one RCP 50; more typically, all diffusers 58 will be installed via the open manways 130 into their respective openings of the support plate 134 before capping the manways 130.) To install the illustrative RCP 50 shown in FIG. 7, the impeller 52 and drive shaft 56 are inserted through the opening 132 so as to position the impeller 52 at its designed position inside the diffuser 58, and the flange 70 is bolted onto the opening 132 to form a seal (typically assisted by a gasket, o-ring, or other sealing element at the flange 70.

Figure 8:
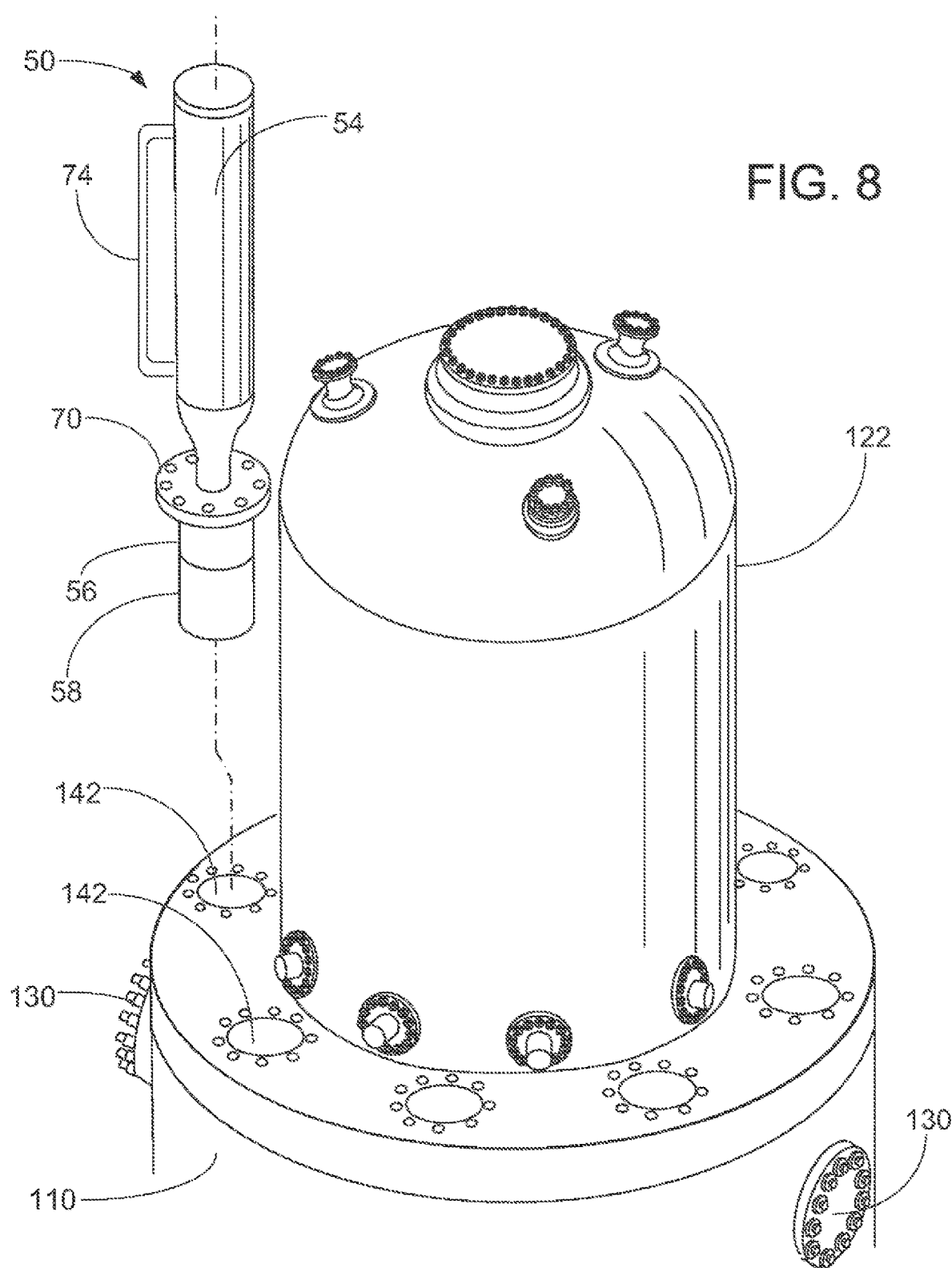
FIG. 8 diagrammatically shows a perspective view of an alternative embodiment of the vessel head region of the PWR of FIG. 1 that includes another alternative RCP embodiment.

With reference to FIG. 8, another embodiment is shown. This embodiment differs from the embodiment of FIGS. 6-7 in that (i) the openings 132 are replaced by larger openings 142 that are sufficiently large to pass the entire assembly inclusive of the diffuser 58, and (ii) in the embodiment of FIG. 8 the RCP 50 is installed as a unitary pump assembly including the motor 54, impeller 52, drive shaft 56, and diffuser 58. In this embodiment the unitary pump assembly includes the motor 54, impeller 52, drive shaft 56, and diffuser 58 secured together as said unitary pump assembly 52, 54, 56, 58 with the impeller 52 disposed in the diffuser 58 in the unitary pump assembly. FIG. 8 diagrammatically indicates the installation by showing the unitary pump assembly 52, 54, 56, 58 (note, the impeller 52 is inside the diffuser 58 and hence not visible in FIG. 8) arranged above a corresponding one of the openings 142 preparatory to inserting the diffuser 58 into the opening 142. This embodiment has the advantage of enabling use of commercially available pumps that may include the pump casing, and also enables removal/replacement of the diffuser 58 via the opening 142. Additionally, this embodiment facilitates pre-alignment of the impeller 52 inside the diffuser 58 prior to installing the RCP 50 at the reactor.

The embodiment of FIG. 8 includes the manways 130. In the embodiment of FIG. 8 the manways 130 are not used for installation/replacement of diffusers 58, but are typically used for performing steam generator tube plugging or other maintenance operations (possibly including inspection of the diffusers 58).

The illustrative embodiments are examples of contemplated variations and variant embodiments; additional variations and variant embodiments that are not illustrated are also contemplated. For example, while the illustrative PWR is an integral PWR including the internal steam generator 36, in some contemplated alternative embodiments an external steam generator is instead employed, in which case the feedwater inlet 40 and steam outlet 42 are replaced by a primary coolant outlet port to the steam generator and a primary coolant inlet port returning primary coolant from the steam generator (alternative embodiment not shown). Moreover, while advantages are identified herein to not mechanically coupling the RCPs 50 to the internal steam generator, it is alternatively contemplated to couple the RCPs to the steam generator inlet, for example by replacing the outlet plenum 62 and illustrative diffusers 58 with pump casings having outlets directly connected with primary coolant inlets of the steam generator.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:
1. A method comprising:
installing a reactor coolant pump comprising a pump motor, a driveshaft, an impeller, and a mounting flange on a pressurized water reactor (PWR) comprising a pressure vessel assembly comprising a vessel body and a vessel head secured thereto, a separator plate that separates the pressure vessel assembly into a pressurizer volume disposed above the separator plate and a reactor volume disposed below the separator plate, the installing including:
pre-assembling the pump motor, the driveshaft, the impeller, and the mounting flange outside of the pressure vessel assembly to form a pump assembly as a unit disposed outside of the pressure vessel assembly in which the pump motor is connected with the impeller by the driveshaft,
inserting the impeller and the driveshaft of the pump assembly through an opening of the pressure vessel assembly while the pump motor remains entirely outside of the pressure vessel assembly, the mounting flange being larger than the opening so that the motor will remain outside of the pressure vessel assembly while allowing passage of the impeller into the pressure vessel assembly, and securing the flange of the pump assembly to an outside of the pressure vessel assembly to mount the pump assembly on the pressure vessel assembly, wherein at least a portion of the pump motor of each reactor coolant pump is disposed above the separator plate.

2. The method of claim 1, wherein the reactor coolant pump further comprises a pump diffuser that is not a component of the unitary pump assembly formed by the pre-assembling, and the installing further comprises:

disposing the pump diffuser inside the pressure vessel assembly in an operation other than the inserting and the securing operations.

3. The method of claim 2, wherein the installing includes disposing the pump diffuser inside the pressure vessel assembly before performing the inserting, and the inserting includes inserting the impeller and the driveshaft through the opening of the pressure vessel assembly so as to position the impeller inside the pump diffuser.

4. The method of claim 2, wherein the opening of the pressure vessel assembly through which the impeller and drive shaft are inserted is too small for the pump diffuser to pass through, and the disposing comprises:

inserting the pump diffuser into the pressure vessel assembly through a manway of the vessel body that is separate from the opening of the pressure vessel assembly through which the impeller and drive shaft are inserted.

5. The method of claim 2, wherein the disposing of the pump diffuser inside the pressure vessel assembly is performed before the inserting of the impeller and the driveshaft of the pump assembly through the opening of the pressure vessel assembly.

6. The method of claim 2, further comprising:

subsequent to installing the reactor coolant pump on the PWR, removing the pump assembly from the PWR while leaving the pump diffuser disposed inside the pressure vessel assembly.

7. The method of claim 1, wherein the inserting and securing mounts the pump assembly on the pressure vessel assembly with the drive shaft of the pump assembly oriented vertically and the pump motor disposed above the impeller.

8. The method of claim 1, wherein the vessel head includes a first mating flange and the vessel body includes a second mating flange, and the vessel head is secured to the vessel body by a step of securing the first mating flange to the second mating flange.

9. The method of claim 1, wherein a nuclear reactor core is disposed in the reactor volume of the pressure vessel assembly.

\* \* \* \* \*